(12) United States Patent
Peng et al.

(10) Patent No.: US 7,791,871 B2
(45) Date of Patent: Sep. 7, 2010

(54) MOUNTING APPARATUS FOR STORAGE DEVICE

(75) Inventors: Wen-Tang Peng, Taipei Hsien (TW); Mo-Ming Yu, Shenzhen (CN); Guang-Hua Gu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 176 days.

(21) Appl. No.: 12/191,279

(22) Filed: Aug. 13, 2008

(65) Prior Publication Data
US 2009/0230276 A1    Sep. 17, 2009

(30) Foreign Application Priority Data
Mar. 17, 2008    (CN) .................. 2008 1 0300605

(51) Int. Cl.
H05K 7/00    (2006.01)
A47B 81/00    (2006.01)
A47G 29/00    (2006.01)

(52) U.S. Cl. .............................. 361/679.33; 312/223.2; 248/694; 361/679.4; 206/701; 369/75.11; 369/77.21

(58) Field of Classification Search ............ 361/679.17, 361/679.3, 679.33, 679.34–679.41; 369/75.1, 369/75.2; 312/332.1, 333, 223.2; 292/113; 360/97.1; 248/694
See application file for complete search history.

(56) References Cited

U.S. PATENT DOCUMENTS

| | | | |
|---|---|---|---|
| 7,480,137 B1 * | 1/2009 | Jyh ....................... | 361/679.33 |
| 7,729,110 B2 * | 6/2010 | Zhang et al. ........... | 361/679.33 |
| 2005/0024819 A1 * | 2/2005 | Peng et al. ................. | 361/685 |
| 2009/0103252 A1 * | 4/2009 | Peng et al. ............... | 361/679.4 |

\* cited by examiner

*Primary Examiner*—Zachary M Pape
*Assistant Examiner*—Jerry Wu
(74) *Attorney, Agent, or Firm*—Zhigang Ma (57) ABSTRACT

A mounting apparatus includes a bracket, and an operating device. The bracket includes a first fixing arm, and a second fixing arm each forming a latching portion, for engaging a storage device. The first fixing arm forms a receiving arm perpendicularly extending from an end thereof. A sliding arm perpendicularly extends from the second fixing arm and slidably received in the receiving arm. A locking portion and a pole are formed on the sliding arm. The operating device is rotatably attached to the received arm. The operating device includes an operating portion exposed out of the bracket, an engaging surface, and a pushing wall. The operating portion is manipulated to allow the engaging surface to engage and disengage the locking portion of the sliding arm, and the pushing wall to push the pole and drive the second fixing arm to move away from the first fixing arm.

18 Claims, 8 Drawing Sheets

MOUNTING APPARATUS FOR STORAGE DEVICE

BACKGROUND

CROSS-REFERENCES TO RELATED APPLICATION

Relevant subject matter is disclosed in the co-pending U.S. patent application filed on the same date and having a same title with the present application, which is assigned to the same assignee with this patent application.

1. Field of the Invention

The present invention relates to mounting apparatuses, and more particularly to a mounting apparatus for a storage device.

2. Description of Related Art

An electronic apparatus, such as a typical desktop computer, tower computer, server, or the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user.

The installation of a hard disk drive in a computer typically involves the use of screws to attach the hard disk drive to a bracket of a computer chassis. However, these screws are usually too small and difficult to handle, the installation of the hard disk drive in the computer is labor-intensive. Additionally, because of their small size, the screws are easily dropped by an assembler into the computer.

What is needed, therefore, is a mounting apparatus which facilitates convenient and quick mounting of a storage device.

DETAILED DESCRIPTION

Figure 1:
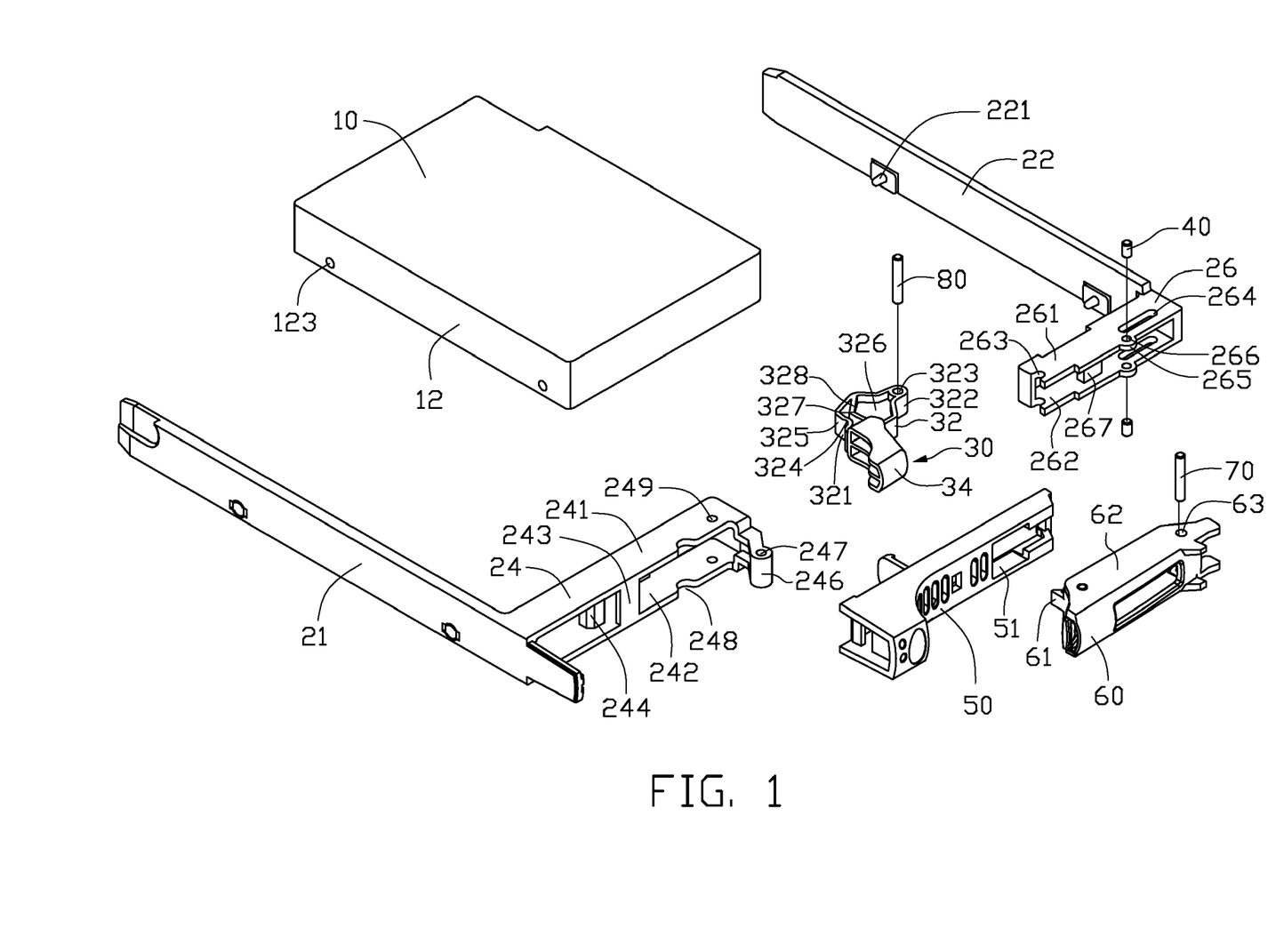
FIG. 1 is an exploded, isometric view of a mounting apparatus with a storage device in accordance with an embodiment of the present invention.
Figure 2:
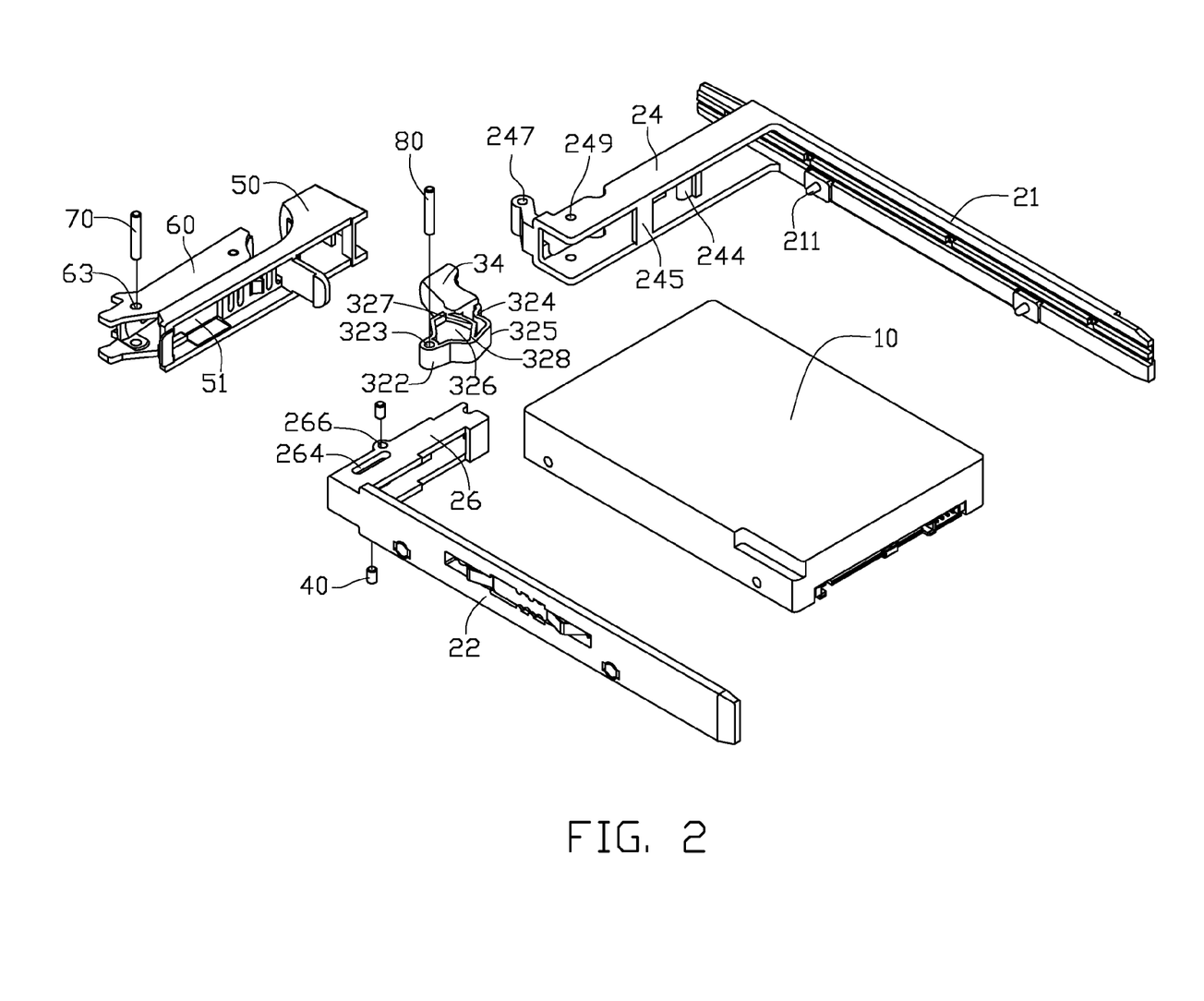
FIG. 2 is similar to FIG. 1, but viewed from another aspect.
Figure 3:
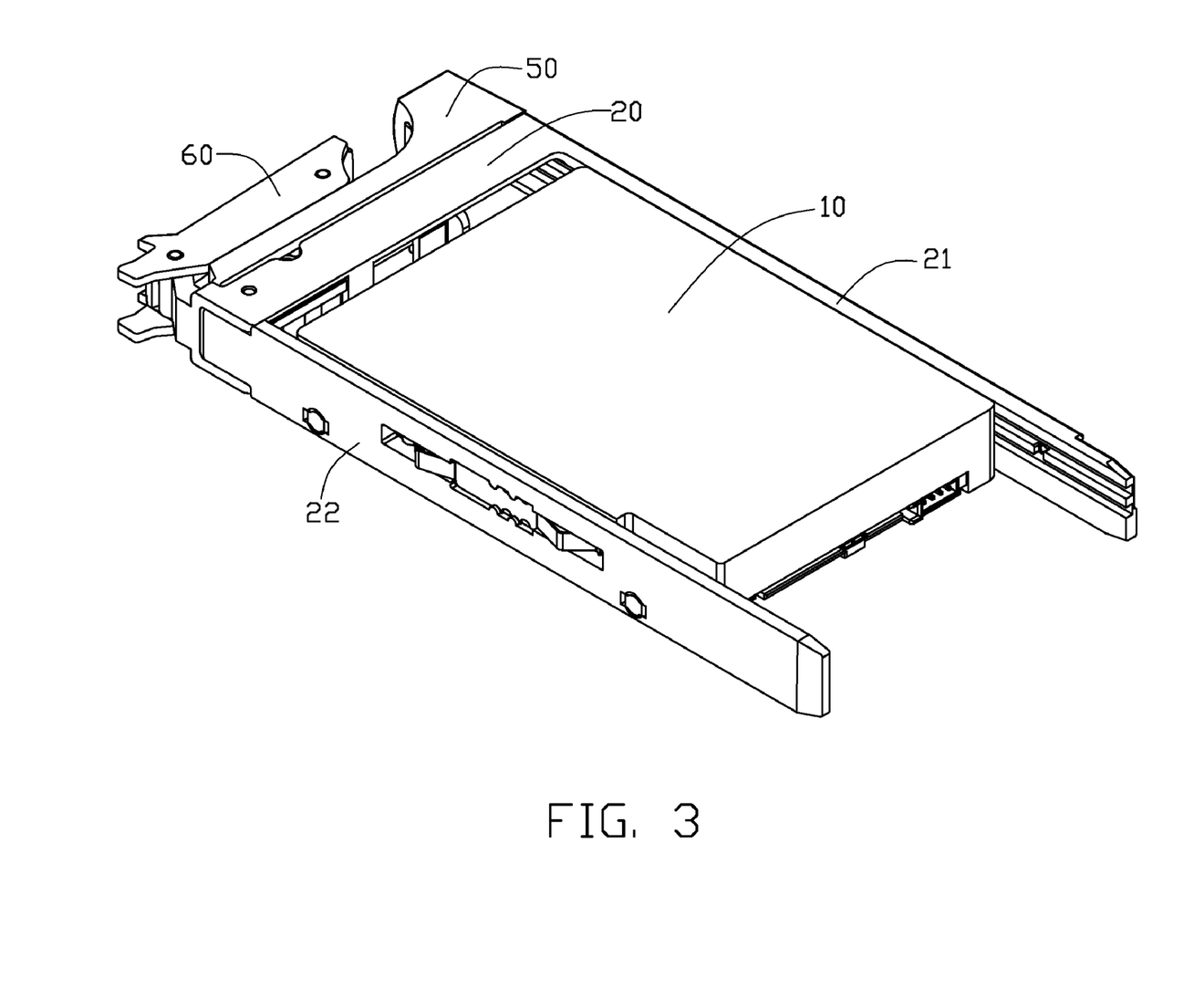
FIG. 3 is an assembled view of FIG. 2.

Referring to FIGS. 1 to 3, a mounting apparatus for a storage device is provided in accordance with an embodiment of the present invention. The mounting apparatus includes a bracket 20 for receiving a storage device 10, an operating device 30, two poles 40, a cover 50, and a handle 60.

The storage device 10 includes two opposite lateral sides 12, and each lateral side 12 defines two spaced fixing holes 123 therein.

The bracket 20 includes a first fixing arm 21, and a second fixing arm 22 opposite to the first fixing arm 21. Two pairs of protruding latching portions 211, 221 are formed on inside surfaces of the first and second fixing arms 21, 22 respectively. The first fixing arm 21 includes a receiving arm 24 perpendicularly extending out from the front end thereof. The receiving arm 24 includes two parallel plates 241, 242 connected to the upper and bottom edges of the first fixing arm 21 respectively. A block 244 is perpendicularly formed between the plates 241, 242. Two stoppers 243, 245 are formed between front edges, and rear edges of the plates 241, 242 respectively. A receiving space is defined among the plates 241, 242, and the stoppers 243, 245. A pivoting portion 246 extends from the front edges adjacent free ends of the plates 241, 242. A pivoting hole 247 is defined in the pivoting portion 246 along a vertical direction. Each of the plates 241, 242 defines a through hole 249 adjacent the pivoting portion 246. The second fixing arm 22 includes a sliding arm 26 perpendicularly extending out from the front end thereof. The sliding arm 26 includes two parallel plates 261, 262 connected to the upper and bottom edges of the second fixing arm 22 respectively. A notch 263 is defined in a free end of each of the plates 261, 262. A sliding slot 264 is defined in each of the plates 261, 262, with a first end adjacent the second fixing arm 22, and a second end away from the second fixing arm 22. A tab 265 protrudes from the front edge of each of the plates 261, 262 adjacent the second end of the corresponding sliding slot 264. A bore 266 is defined in a joint section of each of the plates 261, 262 and the corresponding tab 262. A locking portion 267 is perpendicularly formed between the plates 261, 262.

The operating device 30 includes a main body 32, and an operating portion 34. A protrusion 322 extends out from the main body 32, and a pivoting hole 323 is defined in the protrusion 322. The main body 32 includes an engaging surface 321 opposite to the protrusion 322. A curved recess 324 is defined in a middle portion of the engaging surface 321. A side of the recess 324 forms an arcuate corner 325, and the operating portion 34 extends from the opposite side of the recess 324. A slot is defined in the main body 32 to space the engaging surface 321 and the arcuate corner 325 from a middle portion of the main body 32. Two pentagonal concave sections 326 are defined in upper and bottom surfaces of the middle portion of the main body 32 respectively. Each concave section 326 includes a plurality of sidewalls. One of the sidewalls, which function as a pushing wall 328, is formed on each concave section 326 adjacent the arcuate corner 325. An interior angle 327 toward the arcuate corner 325 of the main body is defined in each concave section 326 adjoining the corresponding pushing wall 328.

The cover 50 is installable on the front of the receiving arm 24 of the first fixing arm 21 of the bracket 20. The cover 50 defines an opening 51.

The handle 60 includes two sidewalls 62, and a receiving space is defined between the sidewalls 62. A hook 61 protrudes from an end of the handle 60. The sidewalls 62 each define a pivoting hole 63 away from the hook 61.

Figure 4:
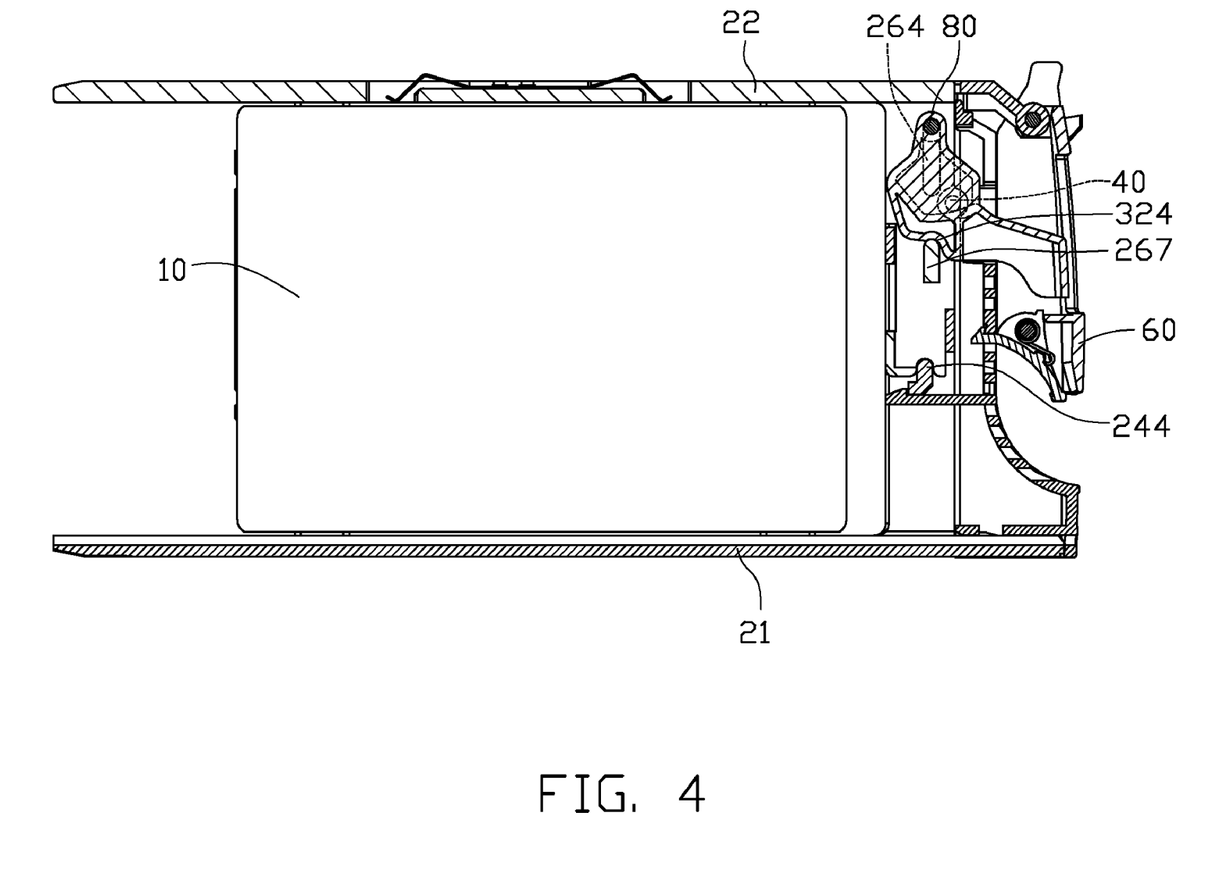
FIG. 4 is a cross-sectional view of FIG. 3, but viewed from another aspect.

Referring further to FIGS. 3 and 4, in assembly, the sliding arm 26 of the second fixing arm 22 is inserted into the receiving space of the receiving arm 24 of the first fixing arm 21, until the notches 263 of the sliding arm 26 engage with the block 244 of the receiving arm 24. The through holes 249 of the receiving arm 24 align with the first ends of the sliding slots 264 of the sliding arm 26. The operating device 30 is placed between the plates 261, 262 of the sliding arm 26, with the operating portion 34 being exposed out of the sliding arm 26, and the pivoting hole 323 of the operating device 30 aligning with the through holes 249 of the receiving arm 24. A post 80 is inserted into the through holes 249 of the receiving arm 24, the sliding slots 264 of the sliding arm 26, and the pivoting hole 323 of the operating device 30. Thereby, the second fixing arm 22 is slidably connected to the first fixing arm 21, and the operating device 30 is rotatably attached to the first fixing arm 21. The operating portion 34 is pushed toward the first fixing arm 21 to drive the main body 32 of the operating device 30 to rotate, until the recess 324 of the main body 32 engages with the locking portion 267 of the sliding arm 26, thereby the second fixing arm 22 is locked to the first fixing arm 21. The poles 40 are inserted into the bores 266 of the plates 261, 262 respectively, with one end of each of the poles 40 being received in the concave sections 326 of the operating device 30 respectively. The cover 50 is installed on the front of the receiving arm 24, and the operating portion 34 of the operating device 30 is exposed out of the opening 51 of the cover 50. The sidewalls 62 of the handle 60 sandwich the pivoting portion 246 of the receiving arm 24. A post 70 is inserted into the pivoting holes 63, 247 of the sidewalls 62 of the handle 60, and the pivoting portion 246. Thereby the handle 60 is pivotably connected to the bracket 20. Thereafter, the handle 60 is rotated to make the hook 61 engage in the cover 50.

Figure 5:
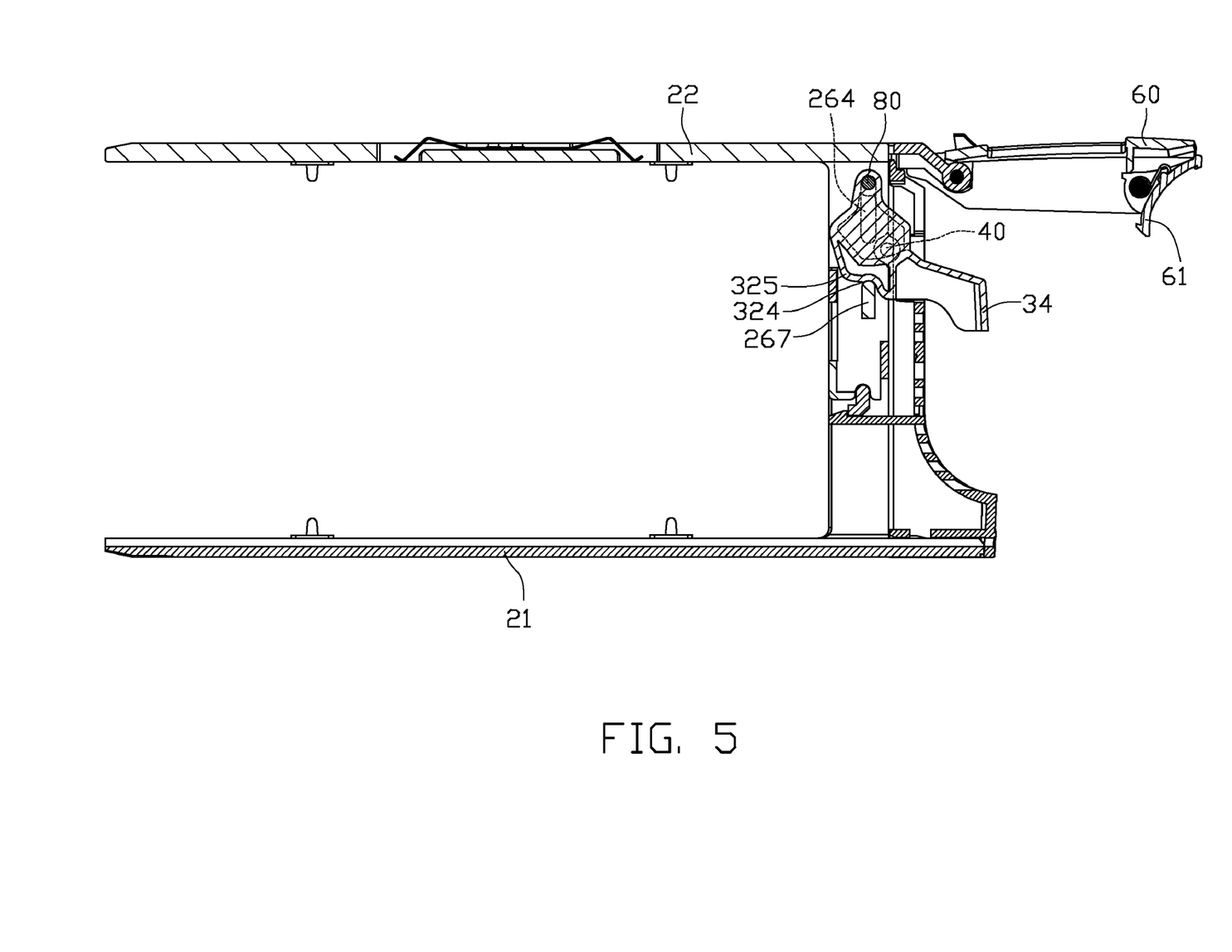
FIGS. 5 to 7 are similar to FIG. 4, but showing different states of the mounting apparatus.
Figure 6:
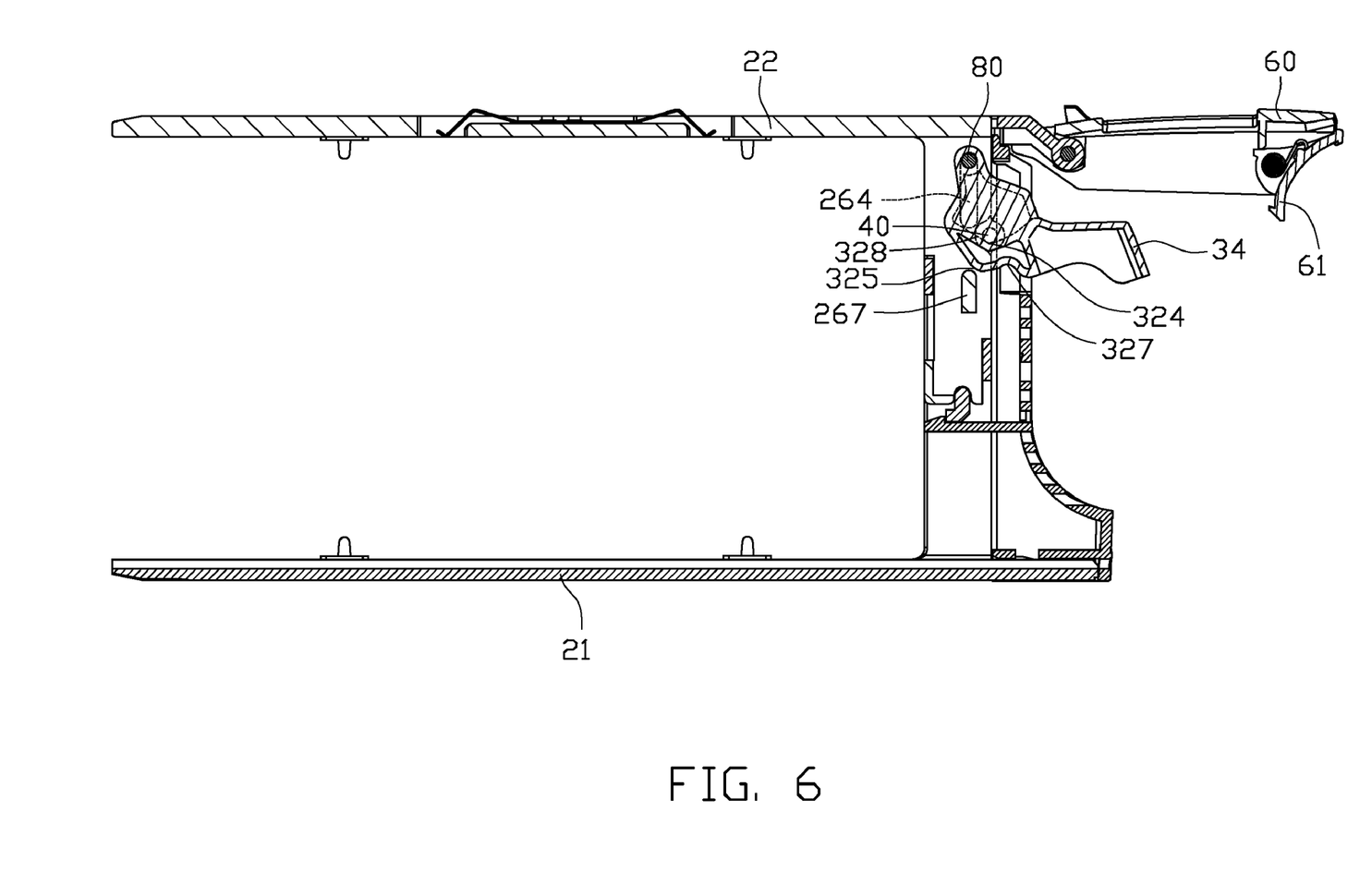
Figure 7:
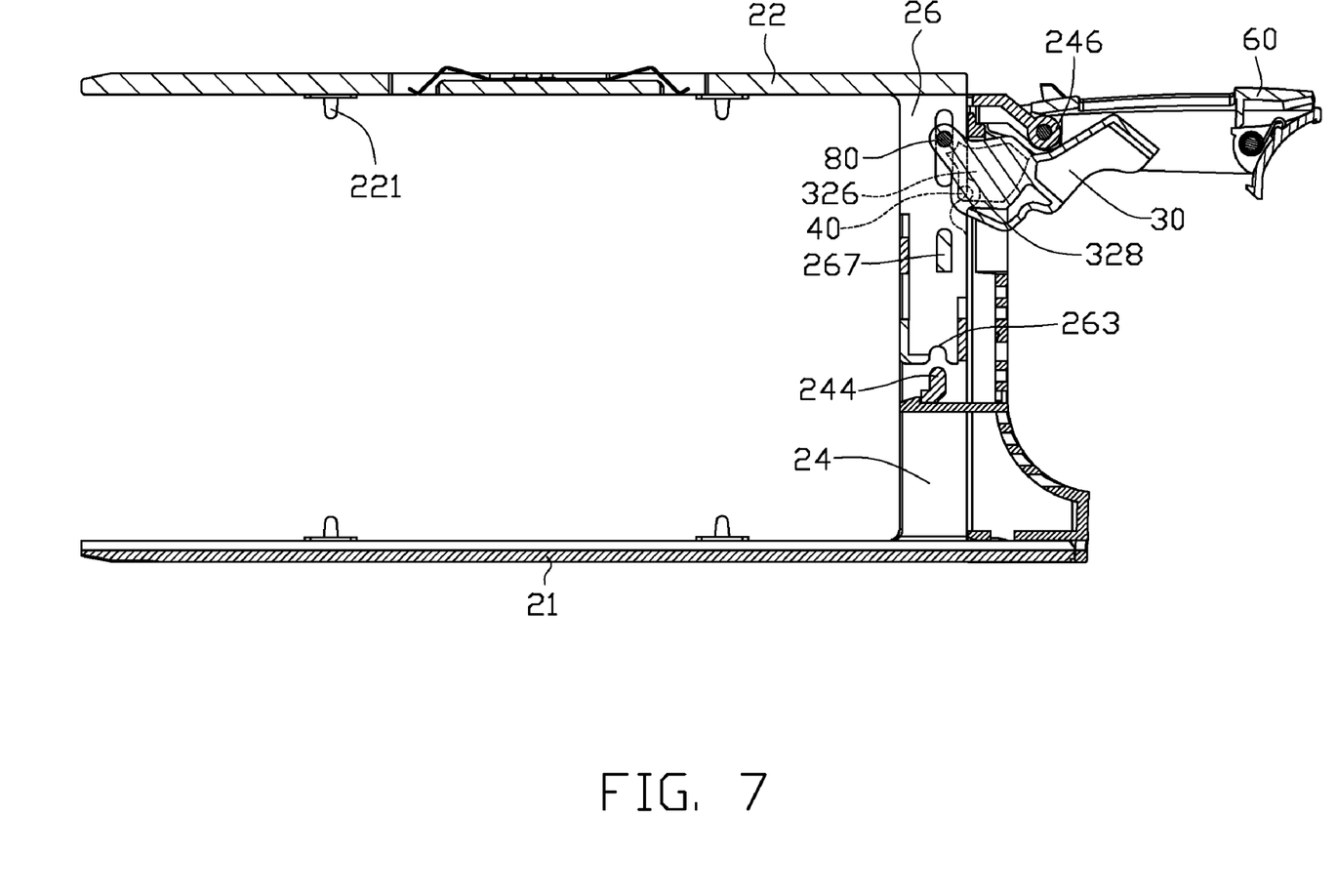
Figure 8:
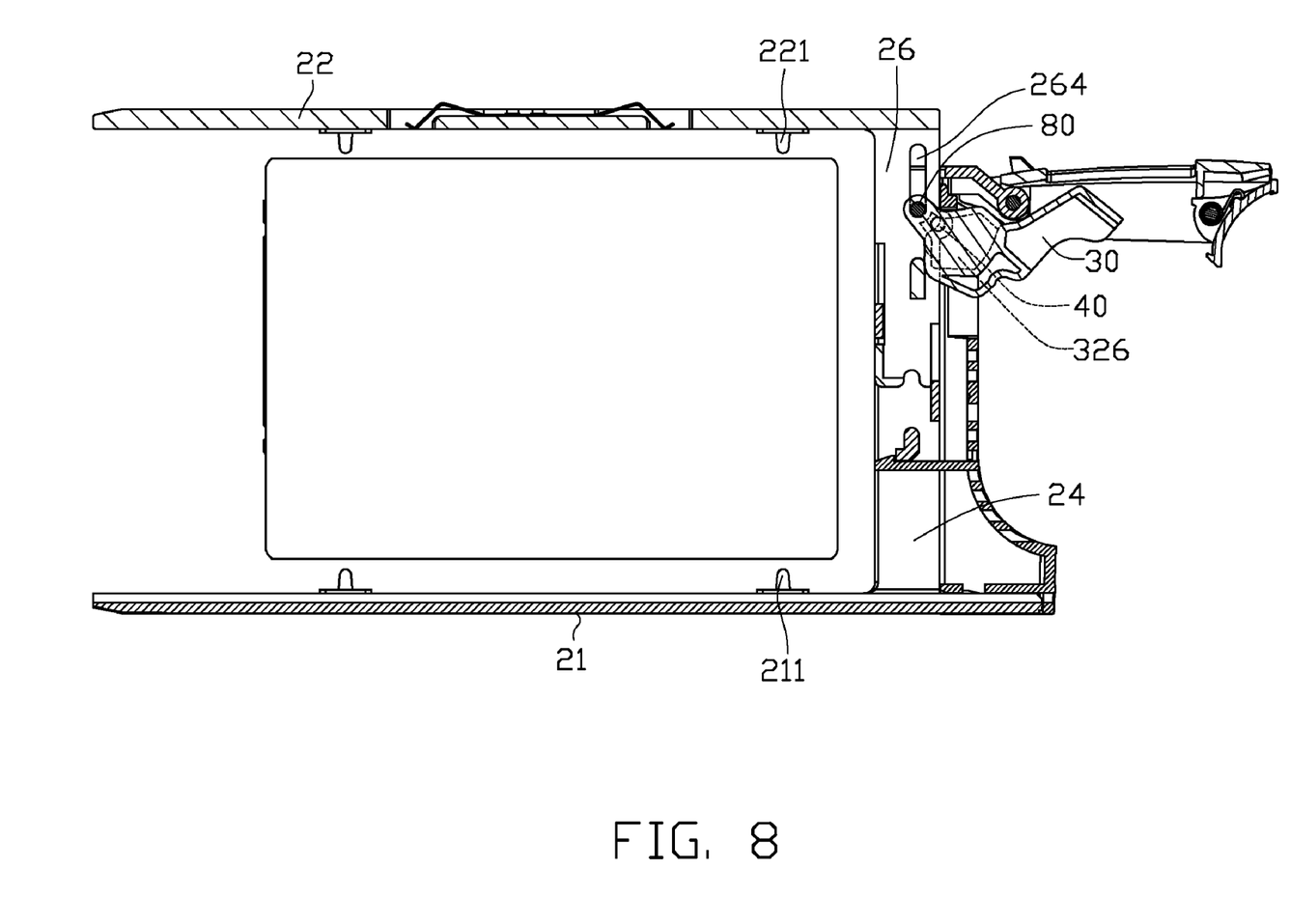
FIG. 8 is similar to FIG. 4, but showing a different state of the mounting apparatus with the storage device.

Referring to FIG. 5, to assemble the storage device 10, the handle 60 is rotated outward to disengage from the cover 50. Referring further to FIGS. 6 and 7, the operating portion 34 is rotated outward, until the recess 324 of the main body 32 disengages from the locking portion 267 of the second fixing arm 26, and the corner 325 gets past the locking portion 267. The second fixing arm 22 is unlocked from the first fixing arm 21. The interior angles 327 of the concave sections 326 of the operating device 30 adjoin the poles 40 respectively. The operating portion 34 is further rotated toward the second fixing arm 22, the pushing walls 328 of the operating device 30 push the corresponding poles 40 to drive the second fixing arm 22 to move away from the first fixing arm 21, until the operating portion 34 abuts against the pivoting portion 246 of the first fixing arm 21. Referring further to FIG. 8, the second fixing arm 22 is pulled away from the first fixing arm 21, until the second ends of the sliding slots 264 of the sliding arm 26 engage with the post 80. The storage device 10 is disposed between the first and second fixing arms 21, 22, with the latching portions 211 of the first fixing arm 21 engaging in the corresponding fixing holes 123 of the storage device 10. The second fixing arm 22 is pushed toward the first fixing arm 21, until the poles 40 engage with the corresponding pushing walls 328 of the operating device 30, as shown in FIG. 7. Referring also to FIG. 6, the second fixing arm 22 is further pushed, the poles 40 push the corresponding pushing walls 328 to drive the operating device 30 to rotate toward the first fixing arm 21, until the notches 263 of the sliding arm 26 engage with the block 244 of the receiving arm 24. The first ends of the sliding slots 264 engage with the post 80. The latching portions 221 of the second fixing arm 22 engage in the corresponding fixing holes 123 of the storage device 10. The interior angles 327 of the concave sections 326 of the operating device 30 contact the poles 40 respectively. Referring to FIG. 5, the operating portion 34 is rotated toward the first fixing arm 21, the corner 325 of the operating device 30 gets past the locking portion 267 of the sliding arm 26 of the second fixing arm 22, and the recess 324 of the operating device 30 engages with the locking portion 267. Thereby, the second fixing arm 22 is locked to the first fixing arm 21, and the storage device 10 is locked. Referring to FIGS. 3 and 4, the handle 60 is rotated to be locked to the cover 50. The operating portion 34 is received in the receiving space of the handle 60, to be protected from accidental operation.

To detach the storage device 10, the handle 60 and operating portion 34 of the operating device 30 are rotated outward in turn, to unlock the second fixing arm 22, and push the second fixing arm 22 to move a distance away from the first fixing arm 21. Then the second fixing arm 22 is pulled away from the first fixing arm 21; thereby the storage device 10 can be taken out.

In this embodiment, the main body 32 and the concave sections 326 of the operating device 30 each have a pentagonal cross-section. In other embodiments, the main body 32 and the concave sections 326 may each have a generally circular cross-section or polygonal cross-section.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mounting apparatus for a storage device, the mounting apparatus comprising:

a bracket comprising a first fixing arm, and a second fixing arm; a latching portion formed on an inside surface of each of the first and second fixing arms configured for engaging the storage device; the first fixing arm forming a receiving arm extending out from an end thereof, a sliding arm extending out from the second fixing arm, the sliding arm slidably connected to the receiving arm; the sliding arm forming a locking portion, and a pole; and an operating device rotatably attached to the receiving arm, the operating device comprising a main body, and a manipulable operating portion extending out from the main body and exposed out of the bracket; the main body comprising an engaging surface facing the first fixing arm, and a pushing wall, the engaging surface abutting against the locking portion of the sliding arm, for locking the second fixing arm to the first arm; upon a condition that the operating device rotated, the engaging surface of the operating device disengaging from the locking portion and unlocking the second fixing arm from the first arm, the pushing wall pushing the pole and driving the second fixing arm to move away from the first fixing arm.

2. The mounting apparatus as claimed in claim 1, further comprising a post, wherein each of the receiving arm and the sliding arm comprises two parallel plates, the plates of the sliding arm are received between the plates of the receiving arm, the operating device is received between the plates of the sliding arm; each of the plates of the receiving arm defines a through hole therein, each of the plates of the sliding arm defines a sliding slot therein, and the operating device forms a protrusion defining a pivoting hole therein; the post is inserted into the through holes of the receiving arm, the sliding slots of the sliding arm, and the pivoting hole of the operating device in turn, to rotatably connect the operating device to the bracket.

3. The mounting apparatus as claimed in claim 2, wherein a block is formed between the plates of the receiving arm, and a notch is defined in a free end of each of the plates of the sliding arm configured for engaging with the block.

4. The mounting apparatus as claimed in claim 1, wherein a curved recess is defined in a middle portion of the engaging surface for engaging with the locking portion of the sliding arm.

5. The mounting apparatus as claimed in claim 1, wherein the main body comprises a plurality of lateral sides such that the main body has a pentagonal cross-section, the engaging surface is one of the lateral sides of the main body.

6. The mounting apparatus as claimed in claim 5, wherein the operating portion extends out from a corner of the engaging surface and an adjoining lateral side.

7. The mounting apparatus as claimed in claim 1, wherein a concave section is defined in the main body of the operating device, an interior angle is defined in the concave section toward the engaging surface of the main body, the pushing wall is formed on a side of the interior angle away from the operating portion.

8. The mounting apparatus as claimed in claim 7, wherein the concave section comprises a pentagonal cross-section.

9. The mounting apparatus as claimed in claim 1, further comprising a handle, wherein the handle is pivotably connected to the receiving arm, the handle comprises a hook engagable with the bracket, a receiving space is defined in the handle, and the operating portion is received in the receiving space.

10. A mounting apparatus for a storage device, the mounting apparatus comprising:
a bracket comprising a first fixing arm, and a second fixing arm; a latching portion formed on an inside surface of each of the first and second fixing arms configured for engaging the storage device; the first fixing arm forming a receiving arm extending out from an end thereof, a sliding arm extending out from the second fixing arm, the sliding arm slidably received in the receiving arm; the sliding arm forming a locking portion;
a pole perpendicularly fixed to the sliding arm; and
an operating device rotatably attached to the received arm, the operating device comprising an operating portion exposed out of the bracket, an engaging surface facing the first fixing arm, and a pushing wall spaced apart from the engaging surface; the engaging surface abutting against the locking portion of the sliding arm, for locking the second fixing arm to the first arm; when the operating device rotated, the engaging surface of the operating device disengaging from the locking portion, and the pushing wall pushing the pole and drive the second fixing arm to move away from the first fixing arm.

11. The mounting apparatus as claimed in claim 10, further comprising a post, wherein each of the receiving arm and the sliding arm comprises two parallel plates, the plates of the sliding arm are received between the plates of the receiving arm, the operating device is received between the plates of the sliding arm; each of the plates of the receiving arm defines a through hole therein, each of the plates of the sliding arm defines a sliding slot therein, and the operating device defines a pivoting hole therein; the post is inserted into the through holes of the receiving arm, the sliding slots of the sliding arm, and the pivoting hole of the operating device in turn, to rotatably connect the operating device to the bracket.

12. The mounting apparatus as claimed in claim 11, wherein a block is formed between the plates of the receiving arm, and a notch is defined in a free end of each of the plates of the sliding arm configured for engaging with the block.

13. The mounting apparatus as claimed in claim 10, wherein a protrusion extends out from the operating device, the pivoting hole is defined in the protrusion, the engaging surface is formed on the operating device opposite to the protrusion.

14. The mounting apparatus as claimed in claim 10, wherein a curved recess is defined in a middle portion of the engaging surface for engaging with the locking portion of the sliding arm.

15. The mounting apparatus as claimed in claim 10, wherein a concave section is defined in the operating device, an interior angle is defined in the concave section toward the engaging surface of the main body, the pushing wall is formed on a side of the interior angle away from the operating portion.

16. The mounting apparatus as claimed in claim 15, wherein one end of the pole is received in the concave section.

17. The mounting apparatus as claimed in claim 10, wherein the front edge of the sliding arm defines a bore, the pole is extended from the bore and fixed to the sliding arm.

18. The mounting apparatus as claimed in claim 10, further comprising a handle, wherein the handle is pivotably connected to the receiving arm, the handle comprises a hook engagable with the bracket, a receiving space is defined in the handle, and the operating portion is received in the receiving space.

* * * * *